US00RE50311E

(19) United States
(12) Reissued Patent
Lee et al.

(10) Patent Number: US RE50,311 E
(45) Date of Reissued Patent: Feb. 25, 2025

(54) DISPLAY MODULE

(71) Applicant: LG DISPLAY CO., LTD., Seoul (KR)

(72) Inventors: Areum Lee, Paju-si (KR); Hakjun Kim, Paju-si (KR); Hyunsu Kim, Paju-si (KR); Jiyeong Yoon, Paju-si (KR); Chiyoung Lee, Paju-si (KR)

(73) Assignee: LG DISPLAY CO., LTD., Seoul (KR)

(21) Appl. No.: 29/938,175

(22) Filed: Apr. 18, 2024

Related U.S. Patent Documents

Reissue of:
(64) Patent No.: Des. 962,947
Issued: Sep. 6, 2022
Appl. No.: 29/722,695
Filed: Jan. 31, 2020

(30) Foreign Application Priority Data

Aug. 1, 2019 (KR) ..... 30-2019-0036883

(51) LOC (15) Cl. ..... 14-02
(52) U.S. Cl.
USPC ..... D14/439
(58) Field of Classification Search
USPC ..... D14/126, 129, 130, 132, 133, 159, 239, D14/307, 336, 371, 372, 374, 375, 376, (Continued)

(56) References Cited

U.S. PATENT DOCUMENTS

D358,587 S * 5/1995 Solero ..... D14/450
D360,199 S * 7/1995 Shu-Ying ..... D14/450
(Continued)

OTHER PUBLICATIONS

Rumor—LG and Samsung to supply iPad 3 displays as Sharp fails to meet Apples approval process, (online) 6 pgs. Posted Jan. 11, 2012. [Retrieved Feb. 9, 2022] https://9to5mac.com/2012/01/11/rumor-lg-and-samsung-confirmed-as-ipad-3-display-suppliers-as-sharp-fails-to-meet-apples-approval-process/.*

*Primary Examiner* — Darlington Ly
(74) *Attorney, Agent, or Firm* — Birch, Stewart, Kolasch & Birch, LLP

(57) CLAIM

The ornamental design for a display module, as shown and described.

DESCRIPTION

FIG. 1 is a front, right perspective view of the display module showing our new design;
FIG. 2 is a front view thereof;
FIG. 3 is a rear view thereof;
FIG. 4 is a left side view thereof;
FIG. 5 is a right side view thereof;
FIG. 6 is a top plan view thereof;
FIG. 7 is a bottom view thereof; and,
FIG. 8 is a rear, left perspective view thereof.
*FIG. 9 is an exploded front, right perspective view thereof;*
*FIG. 10 is a front, right perspective view of a second embodiment thereof;*
*FIG. 11 is a front view thereof;*
*FIG. 12 is a rear view thereof;*
*FIG. 13 is a left side view thereof;*
*FIG. 14 is a right side view thereof;*
*FIG. 15 is a top plan view thereof;*
*FIG. 16 is a bottom view thereof;*
*FIG. 17 is a rear, left perspective view thereof; and,*
*FIG. 18 is an exploded front, right perspective view thereof.*
*The broken lines depict portions of the display module that form no part of the claimed design.*

1 Claim, 18 Drawing Sheets

Figure 1:
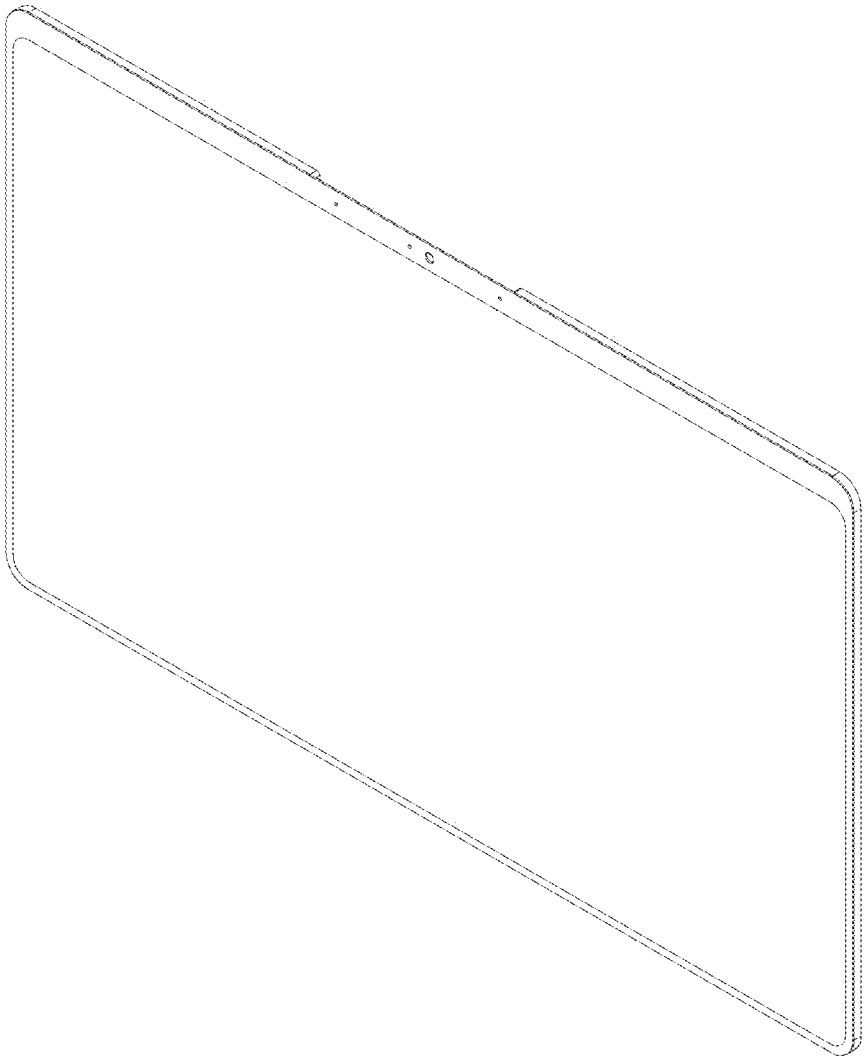
Figure 2:
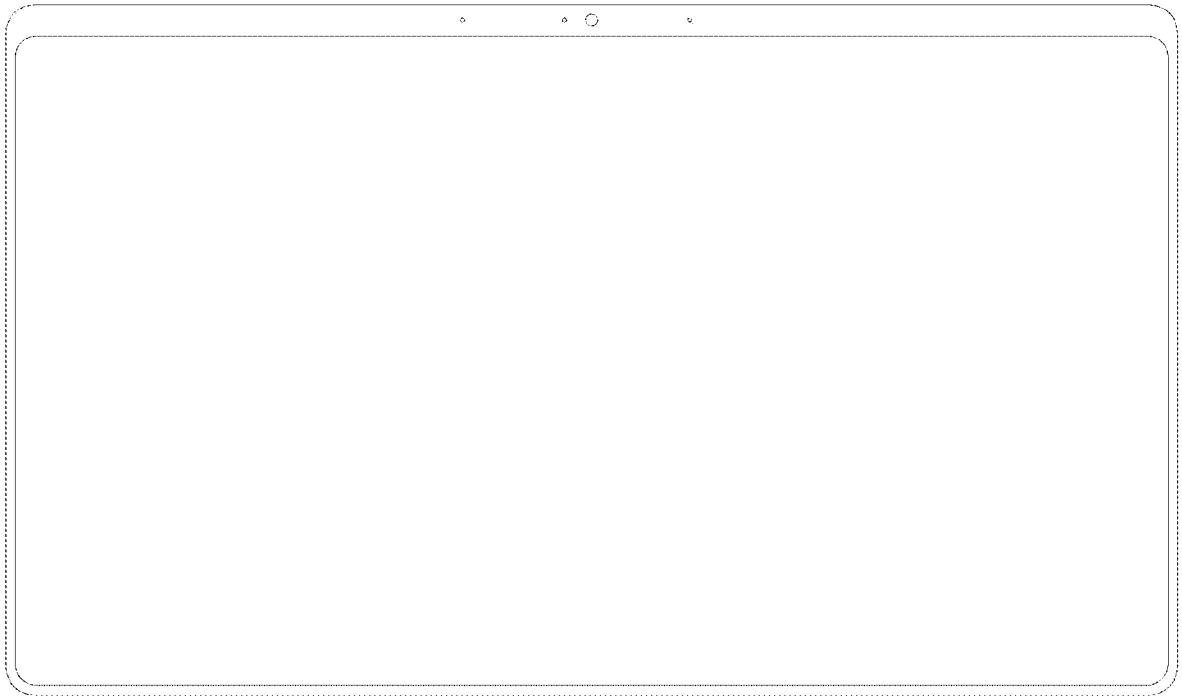
Figure 3:
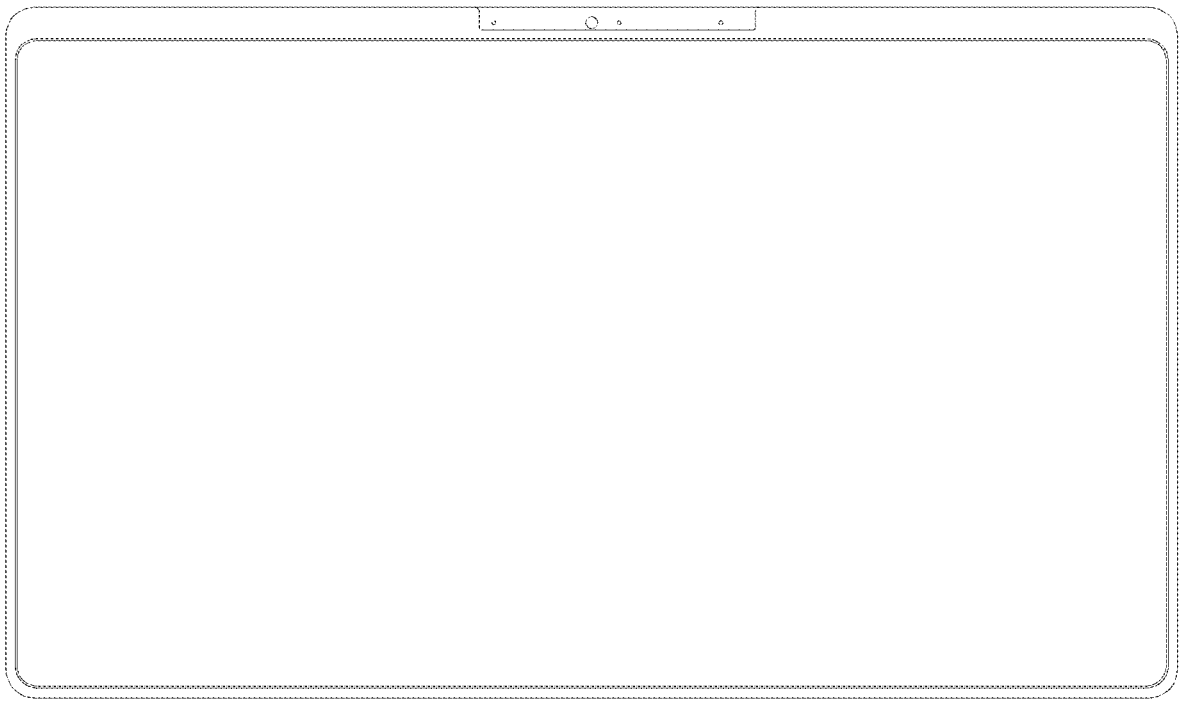
Figure 4:
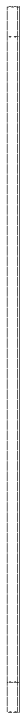
Figure 5:
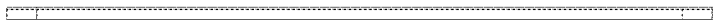
Figure 8:
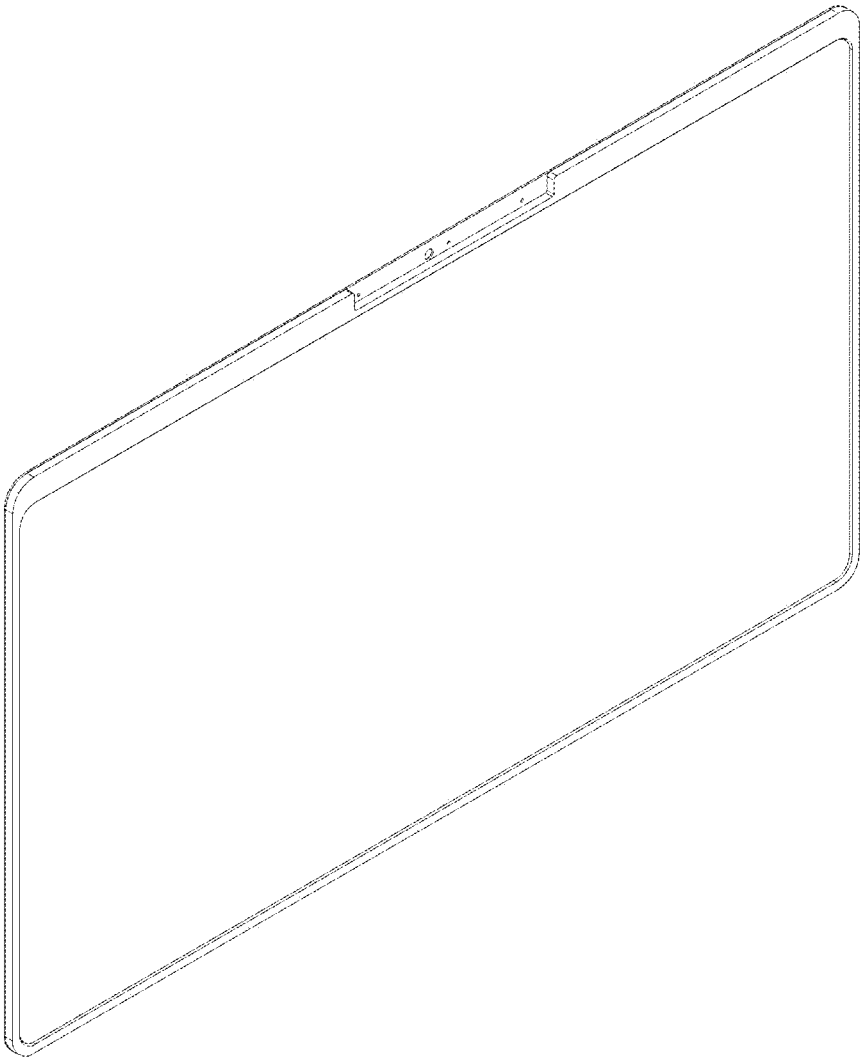

Matter enclosed in heavy brackets [ ] appears in the original patent but forms no part of this reissue; matter printed in italics indicates the additions made by reissue.

(58) Field of Classification Search
USPC ..... D14/383, 448, 451, 496, 432, 450, 248, D14/439; D20/10, 18, 19, 21, 39
CPC .... G06F 1/1601; G06F 1/1642; G06F 1/1643; G06F 1/182; G06F 1/20; G02F 1/133; G02F 1/133308; G02F 1/133311; G02F 1/133314; G02F 1/13332; G02F 1/133331
See application file for complete search history.

(56) References Cited

U.S. PATENT DOCUMENTS

D364,153 S * 11/1995 Umaba ..... D14/374
D364,395 S * 11/1995 Uratani ..... D14/374
D489,071 S * 4/2004 Nishioka ..... D26/1
D489,073 S * 4/2004 Nishioka ..... D26/1
D620,932 S * 8/2010 Andre ..... D14/374
D637,195 S * 5/2011 Stammers ..... D14/450
D638,015 S * 5/2011 Chong ..... D14/383
D647,106 S * 10/2011 Akana ..... D14/203.3
8,116,073 B2 * 2/2012 Hung ..... G06F 1/1624 361/679.28
D659,163 S * 5/2012 Akana ..... D14/203.3
D661,311 S * 6/2012 Akana ..... D14/448
D661,707 S * 6/2012 Akana ..... D14/203.3
D662,094 S * 6/2012 Mack ..... D14/371
D662,922 S * 7/2012 Akana ..... D14/250
D665,808 S * 8/2012 Wang ..... D14/248
D670,286 S * 11/2012 Akana ..... D14/341
D689,475 S * 9/2013 Andre ..... D14/250
D690,300 S * 9/2013 Akana ..... D14/341
D697,511 S * 1/2014 Andre ..... H04M 1/0266 D14/439
D714,294 S * 9/2014 Dinh ..... D14/439
D716,780 S * 11/2014 Park ..... D14/248
D732,040 S * 6/2015 Chuang ..... D14/439
D744,469 S * 12/2015 Kim ..... D14/248
D749,053 S * 2/2016 Paihonen ..... D14/138 G
D749,590 S * 2/2016 Dinh ..... D14/439
D751,559 S * 3/2016 Babiarz ..... D14/432
D752,035 S * 3/2016 Akana ..... D14/374
D764,434 S * 8/2016 Akana ..... D14/203.7
D766,909 S * 9/2016 Andre ..... D14/448
D786,246 S * 5/2017 Park ..... D14/374
D793,465 S * 8/2017 Kong ..... D16/208
D794,005 S * 8/2017 Kwon ..... D14/248
D794,636 S * 8/2017 Park ..... D14/374
D796,496 S * 9/2017 Lee ..... D14/248
D813,227 S * 3/2018 Lin ..... D14/341
D817,314 S * 5/2018 Kwon ..... D14/248
D824,389 S * 7/2018 Dinh ..... D14/439
D829,206 S * 9/2018 Akana ..... D14/341
D832,266 S * 10/2018 Akana ..... D14/439
D832,267 S * 10/2018 Akana ..... D14/439
D832,829 S * 11/2018 Kwon ..... D14/248
D832,846 S * 11/2018 Wadsworth ..... D14/432
D841,003 S * 2/2019 Akana ..... D14/341
D844,012 S * 3/2019 Leipold ..... G02B 1/11 D14/450
D844,625 S * 4/2019 Liu ..... D14/450
D856,338 S * 8/2019 Akana ..... D14/439
D863,307 S * 10/2019 Yi ..... D14/432
D863,308 S * 10/2019 Yi ..... D14/432
D870,102 S * 12/2019 Akana ..... D14/341
D873,832 S * 1/2020 Akana ..... D14/439
D874,450 S * 2/2020 Cha ..... D14/248
D876,415 S * 2/2020 Yi ..... D14/248
D882,528 S * 4/2020 Fariello ..... D13/162
D884,688 S * 5/2020 Cha ..... D14/248
D886,090 S * 6/2020 Cha ..... D14/248
D886,091 S * 6/2020 Cha ..... D14/248
D890,762 S * 7/2020 Nam ..... D14/439
D893,490 S * 8/2020 Akana ..... D14/439
D893,491 S * 8/2020 Akana ..... D14/439
D895,627 S * 9/2020 Akana ..... D14/439
D900,112 S * 10/2020 Cho ..... D14/439
D901,508 S * 11/2020 Akana ..... D14/439
D903,643 S * 12/2020 Akana ..... D14/248
D905,695 S * 12/2020 Akana ..... D14/439
D908,706 S * 1/2021 Ahn ..... D14/439
D912,057 S * 3/2021 Chang ..... D14/439
D914,024 S * 3/2021 Kim ..... D14/439
D917,490 S * 4/2021 Lee ..... D14/439
D920,302 S * 5/2021 Seo ..... D14/248
D920,307 S * 5/2021 Seo ..... D14/248
D920,334 S * 5/2021 Akana ..... D14/439
D926,765 S * 8/2021 Akana ..... D14/439
D928,163 S * 8/2021 Akana ..... D14/439
D933,655 S * 10/2021 Lyu ..... D14/371
D938,428 S * 12/2021 Akana ..... D14/432
D938,429 S * 12/2021 Akana ..... D14/432
D938,952 S * 12/2021 Akana ..... D14/432
D938,955 S * 12/2021 Akana ..... D14/432
D962,947 S * 9/2022 Lee ..... D14/439
D999,208 S * 9/2023 Furujiku ..... D14/341
D1,003,266 S * 10/2023 Chen ..... D14/138 AB
D1,003,267 S * 10/2023 Chen ..... D14/138 AB
D1,003,268 S * 10/2023 Chen ..... D14/138 AA
D1,005,299 S * 11/2023 Lin ..... D14/450
D1,006,029 S * 11/2023 Lin ..... D14/450
D1,007,455 S * 12/2023 Zhou ..... D14/138 AB
D1,020,732 S * 4/2024 Lee ..... D14/450
D1,021,912 S * 4/2024 Li ..... D14/450
2011/0188179 A1 * 8/2011 Myers ..... H01Q 1/42 361/679.01
2013/0258609 A1 * 10/2013 Ke ..... H05K 5/02 361/747
2014/0077690 A1 * 3/2014 Lee ..... H05K 5/0217 361/679.01
2016/0286920 A1 * 10/2016 Lean ..... A45F 5/00
2020/0105194 A1 * 4/2020 Kim ..... H10K 59/871
2020/0305298 A1 * 9/2020 Lee ..... H05K 9/002

* cited by examiner

FIG. 6

FIG. 7

FIG. 9
(NEW)
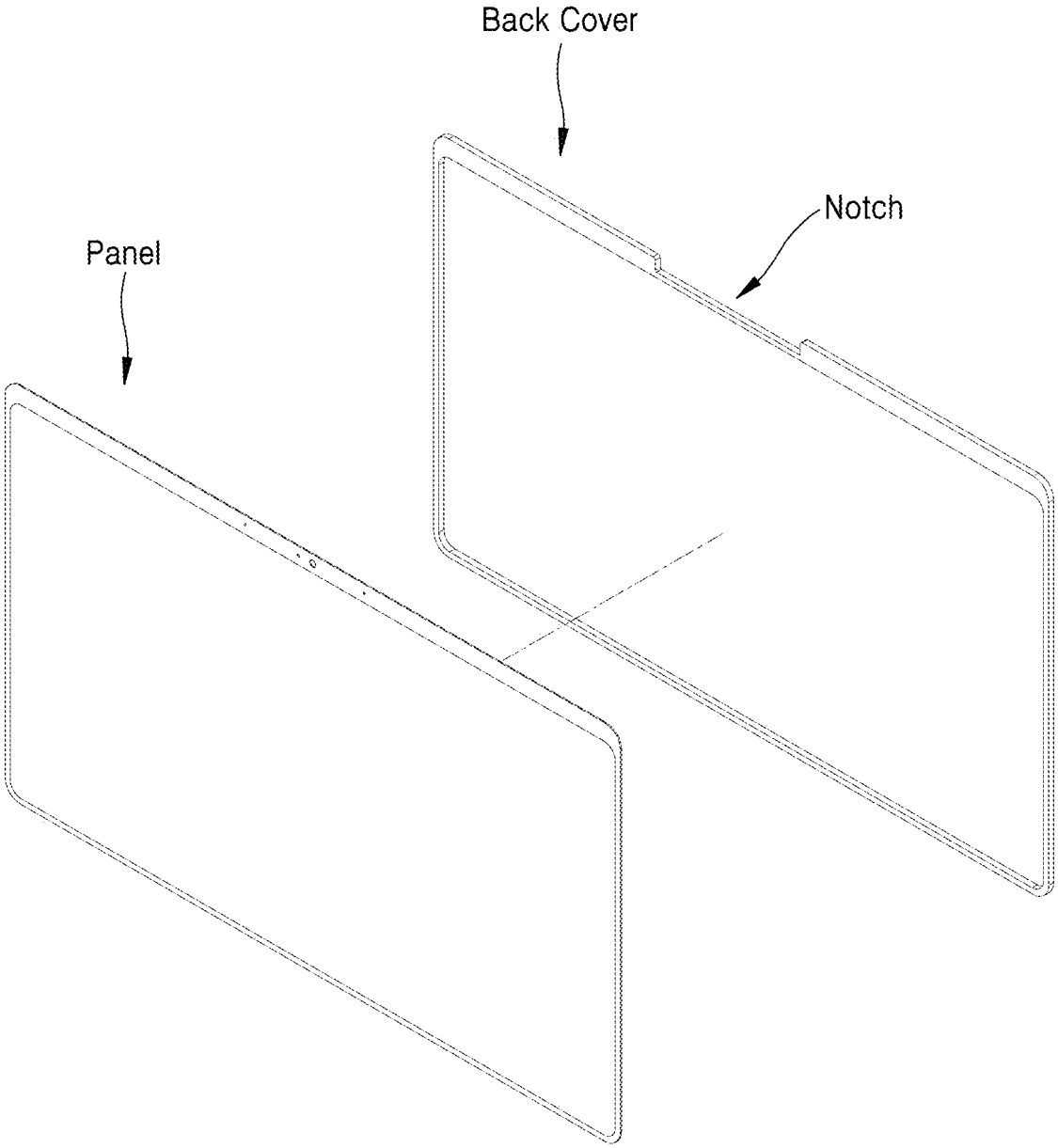

FIG. 10
(NEW)
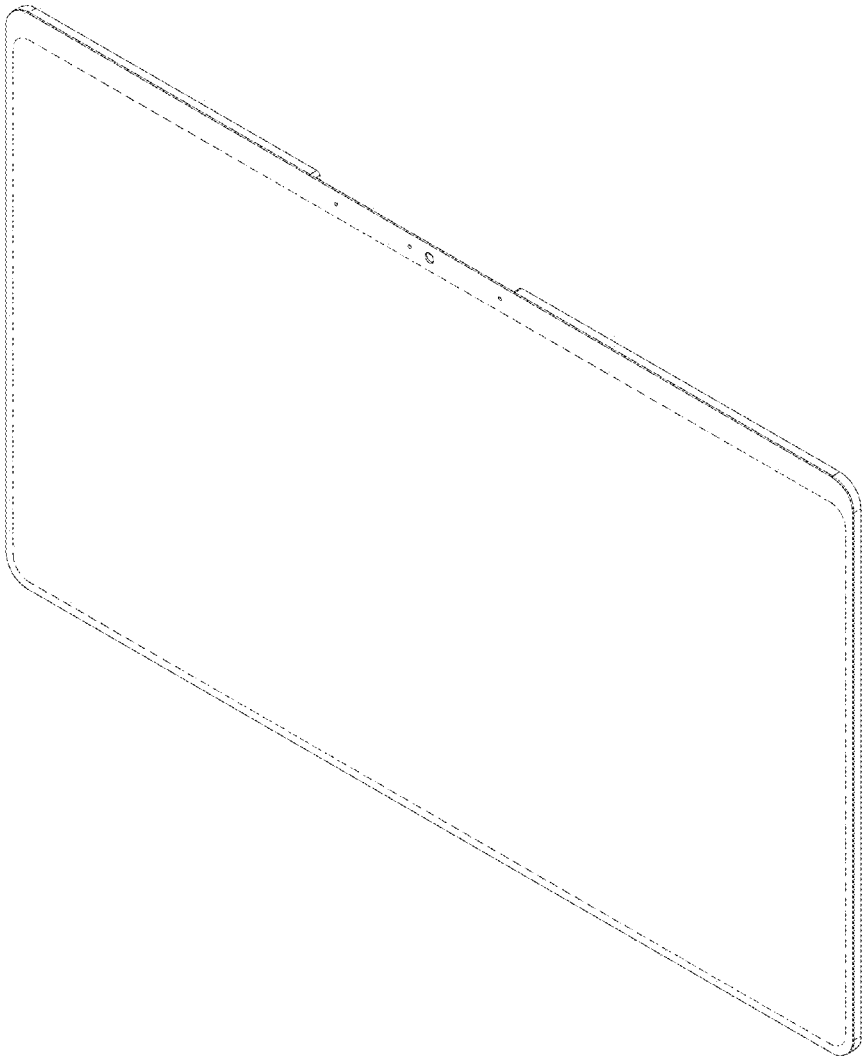

FIG. 11
(NEW)
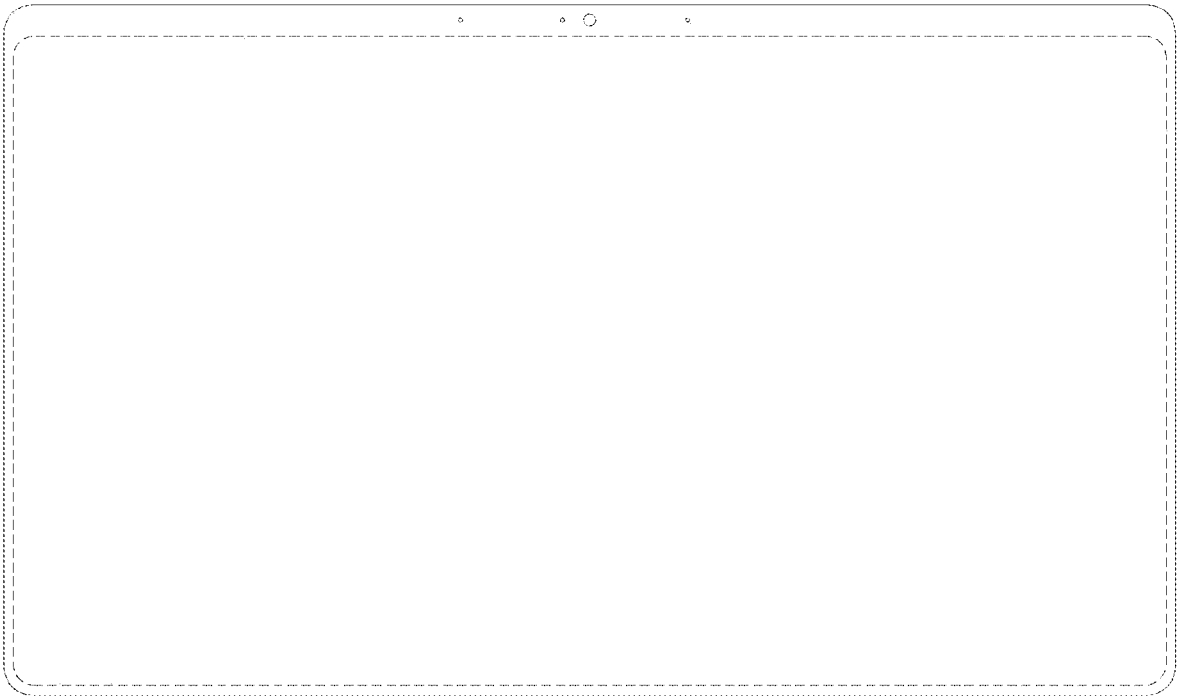

FIG. 12
(NEW)
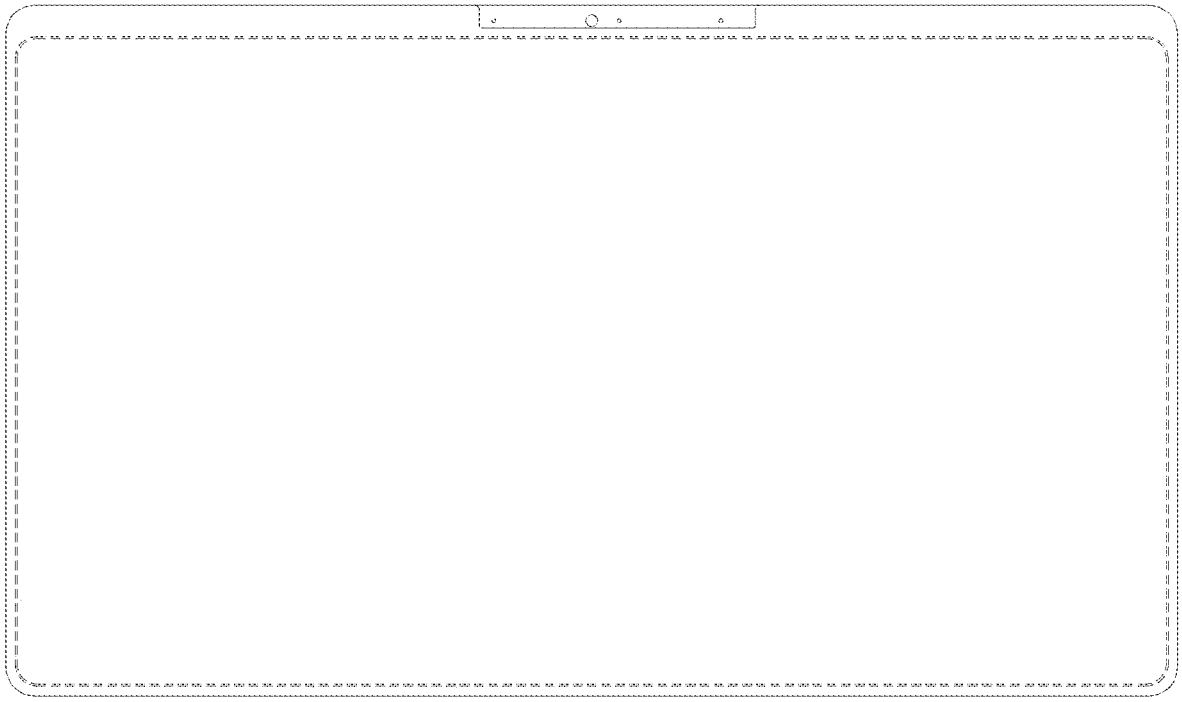

FIG. 13
(NEW)
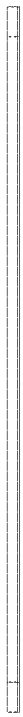

FIG. 14
(NEW)
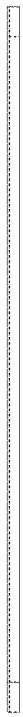

FIG. 15
(NEW)

FIG. 16
(NEW)

FIG. 17
(NEW)
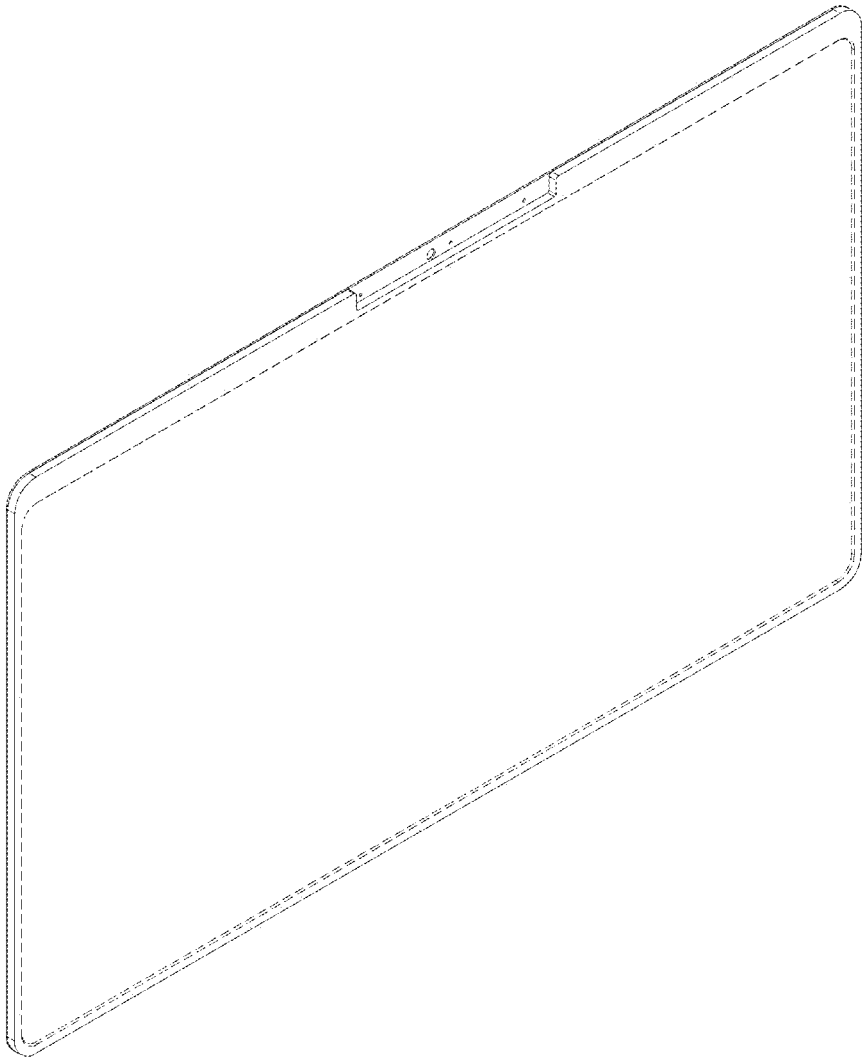

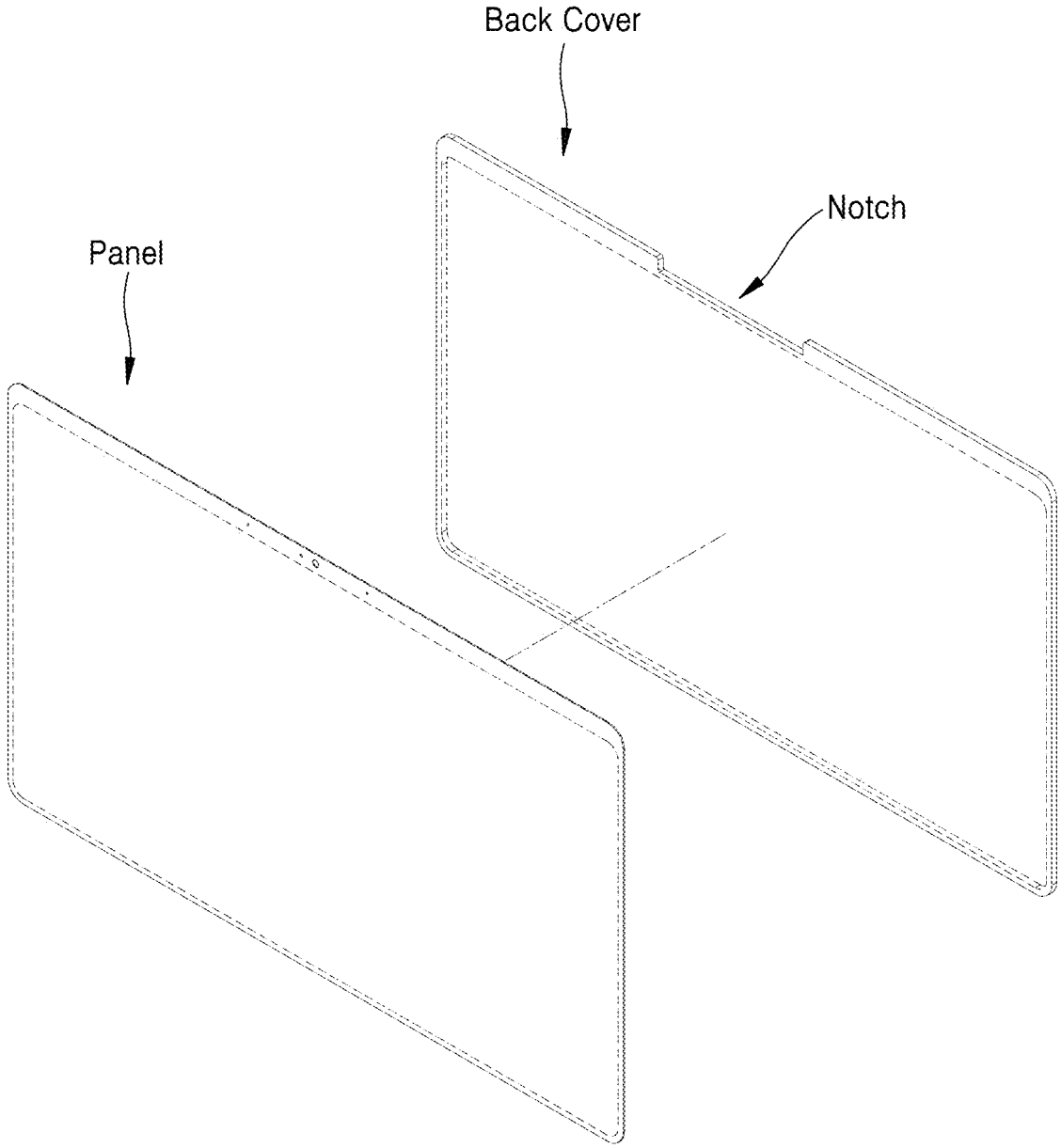

FIG. 18
(NEW)